Figure 1:
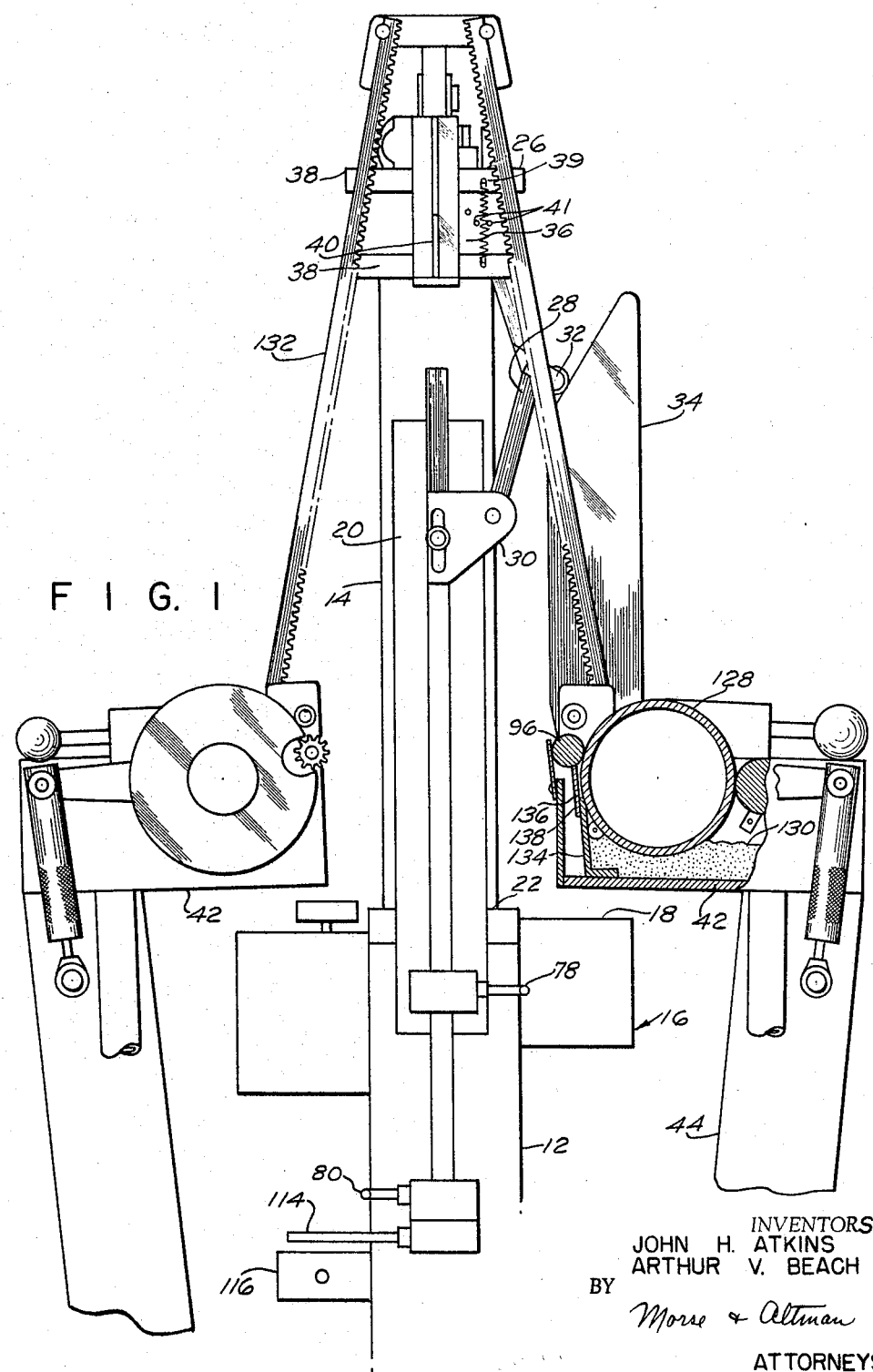

Oct. 18, 1966  J. H. ATKINS ET AL  3,279,426
CASING-IN MACHINE

Filed Sept. 5, 1963  7 Sheets-Sheet 1

INVENTORS
JOHN H. ATKINS
ARTHUR V. BEACH
BY
Morse & Altman
ATTORNEYS

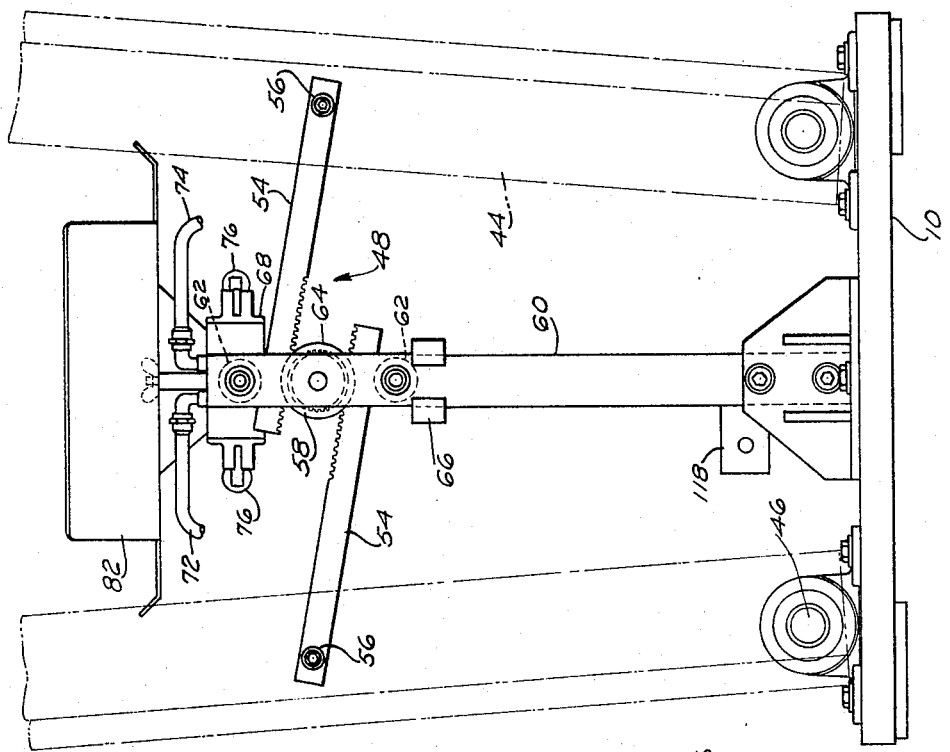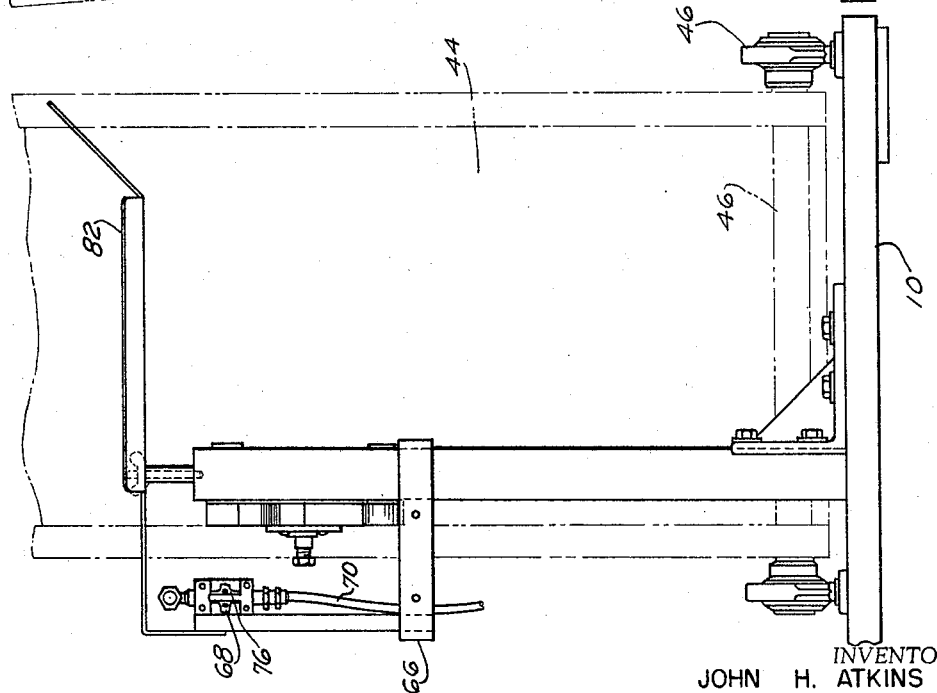

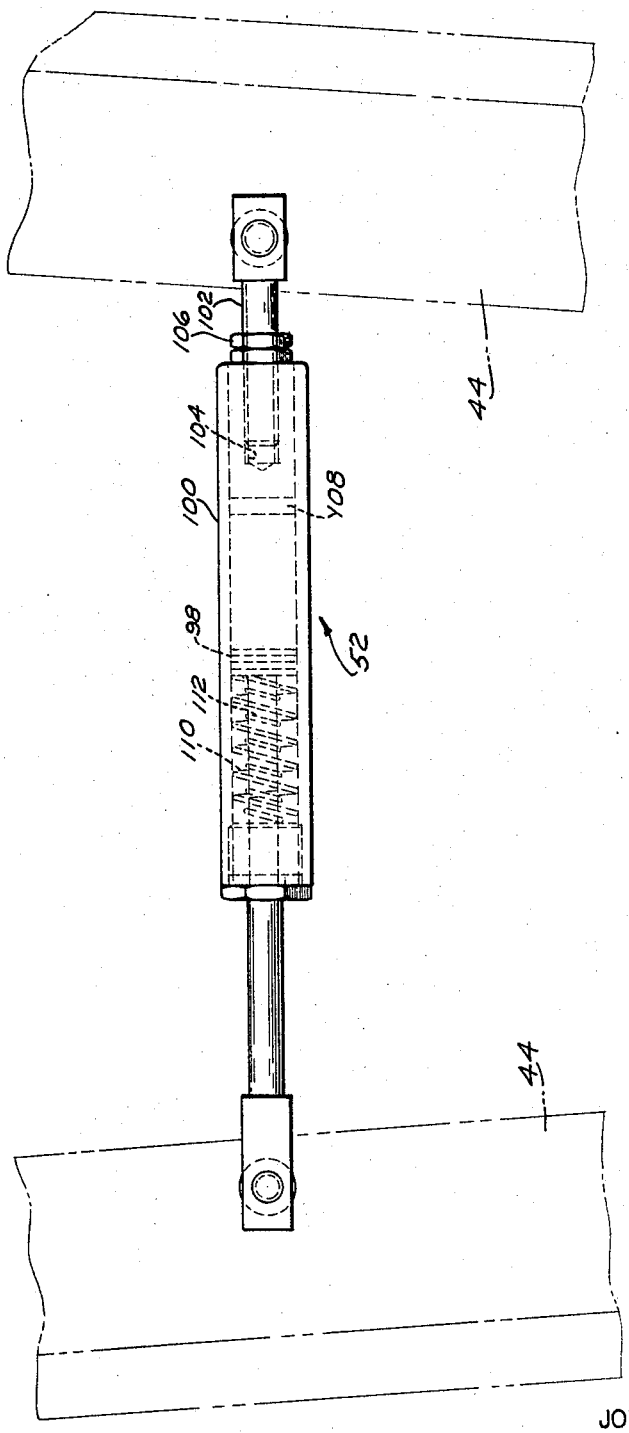

Oct. 18, 1966   J. H. ATKINS ET AL   3,279,426
CASING-IN MACHINE

Filed Sept. 5, 1963   7 Sheets-Sheet 6

INVENTORS
JOHN H. ATKINS
ARTHUR V. BEACH

INVENTORS
JOHN H. ATKINS
ARTHUR V. BEACH

United States Patent Office 3,279,426
Patented Oct. 18, 1966

3,279,426
CASING-IN MACHINE
John Howard Atkins, Lexington, and Arthur V. Beach, North Attleboro, Mass., assignors to Oversewing Machine Company of America, Medford, Mass., a corporation of Massachusetts
Filed Sept. 5, 1963, Ser. No. 306,849
7 Claims. (Cl. 118—227)

This invention relates generally to casing-in machines and more particularly is directed towards improvements in the apparatus illustrated and described in copending application Serial No. 110,575 now U.S. Patent No. 3,117,890 issued January 14, 1964. The apparatus disclosed in the copending application and the present invention is directed towards a mechanism for applying controlled amounts of adhesive to the end sheets of books of various thicknesses.

In the art of bookbinding, the hard outer cover is customarily secured to the sewn book by means of a layer of adhesive applied to the end sheets. Customarily the adhesive coating is applied by means of a casing-in machine which may employ a pair of spaced rollers adapted to apply the adhesive to the end sheets of the unbound book as it is drawn between the rollers.

Heretofore, casing-in machines were so constructed that they were capable of handling books of a single thickness and required rather extensive adjustments, each time a change in book thickness occurred. In copending application 110,575, there is disclosed a casing-in machine capable of accommodating without adjustment books of various thicknesses, widths and lengths. As disclosed in the copending application, the casing-in machine employs a pair of glue pots, each carrying transfer rollers and each mounted to a pivoted frame member adapted to move the glue pots and transfer rollers to and away from one another as a book is reciprocated between the rollers. In the apparatus a book carrying wing is reciprocated in timed coordination with the movement of the pivoted frame members so that the transfer rollers contact the book when it reaches a registering position. The present invention concerns itself with improving the actuating and driving system for moving the frame members and also with stabilizing the movement of the frame members. Accordingly, it is an object of the present invention to provide improvements in casing-in machines of the sort that can accommodate books in a wide range of thicknesses.

Another object of this invention is to provide an improved driving system for moving adhesive transfer units to and away from one another.

Still another object of this invention is to provide in a casing-in machine of the above type a novel stabilizing mechanism for moving adhesive transfer units in a synchronized manner.

More particularly, this invention features a pneumatic actuating system for opening and closing the gap between a pair of adhesive applicator units under precisely damped movement. This system features a pair of pneumatic cylinders one of which includes an adjustable hydraulic damping system for controlling the operation of the pneumatic cylinder.

This invention also features an adjustable mechanical stop having a two-stage spring arrangement for limiting the movement of the adhesive transfer units.

As a further feature of this invention a rack is pivoted to each of the frames that support adhesive transfer units with the two racks being in mesh with a single pinion to provide an automatic self-stabilizing system for the apparatus. This invention includes as yet another feature an improved actuating system for controlling the various movements of the apparatus.

Figure 2:
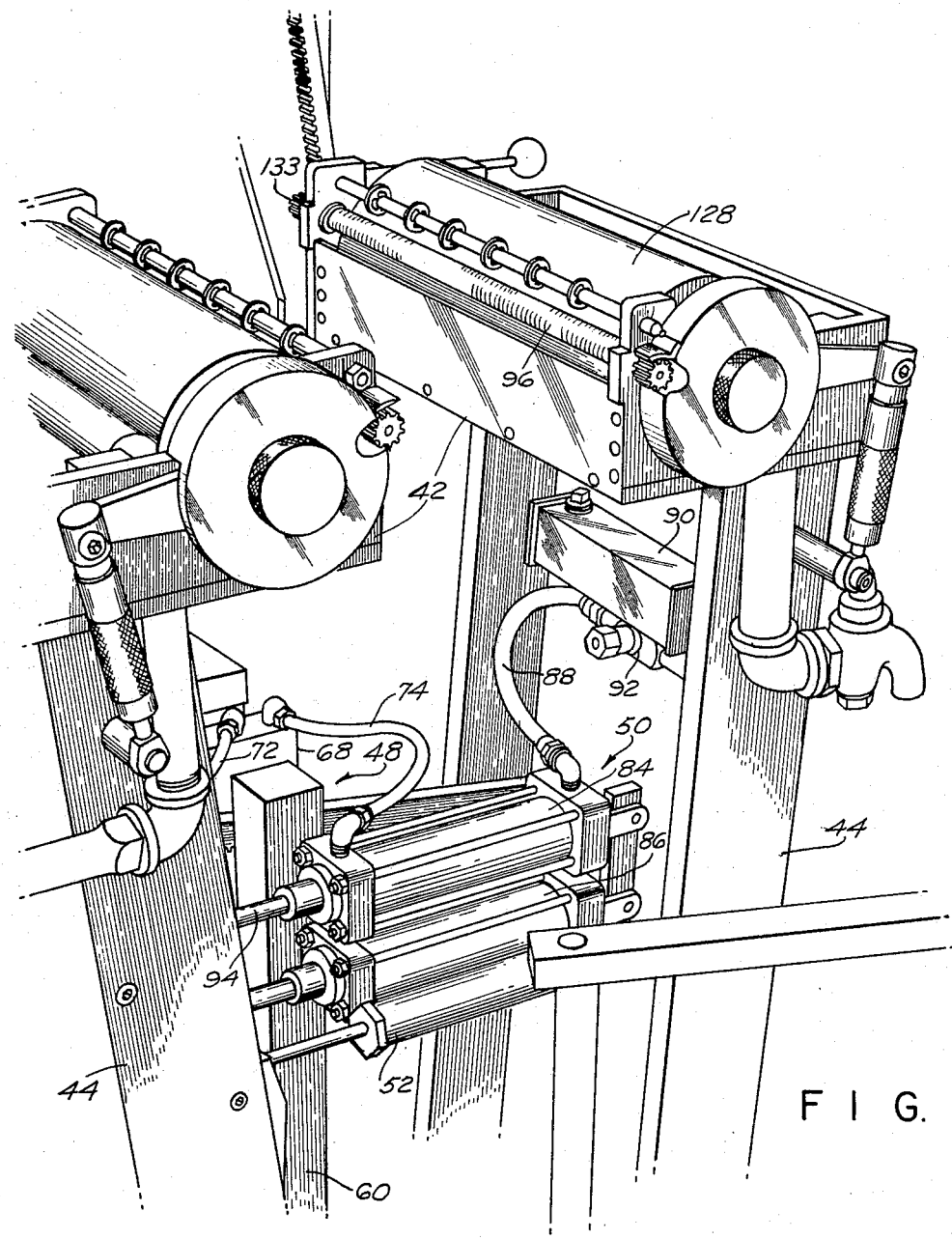
Figure 6:
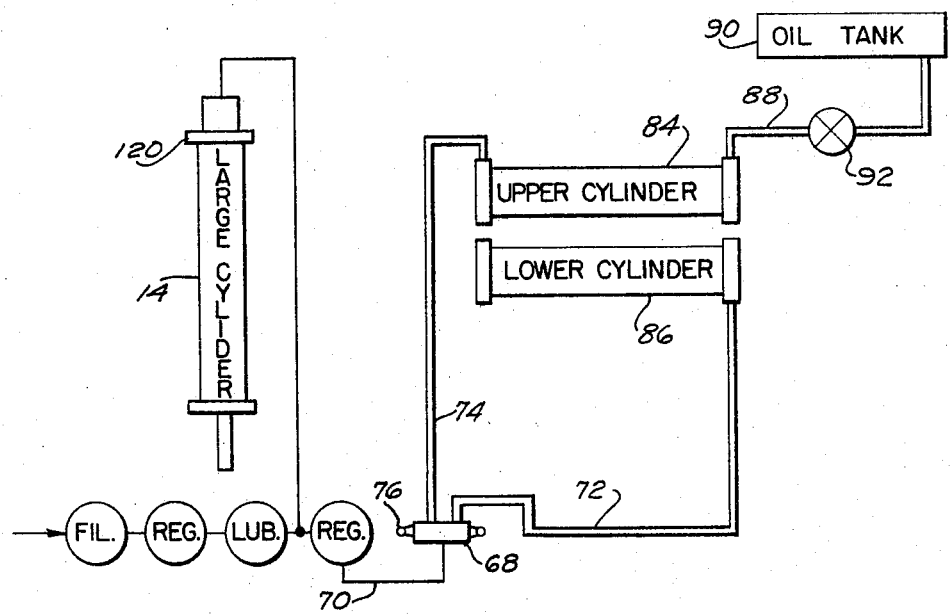
Figure 7:
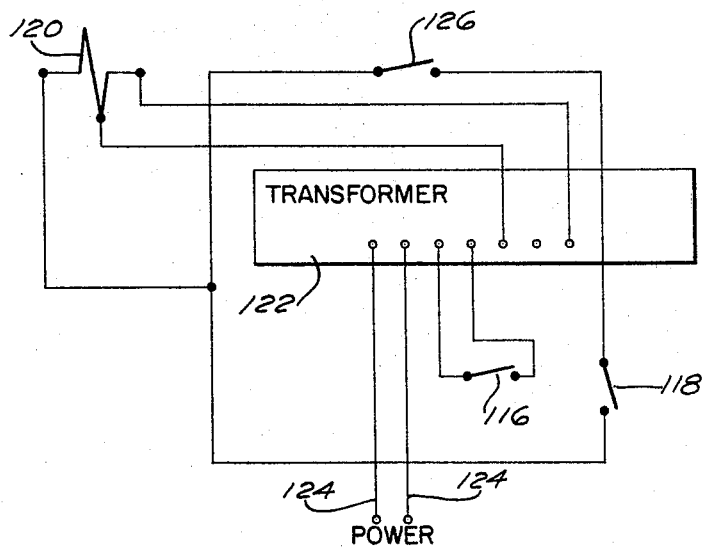

But these and other features of the invention, along with further objects and advantages thereof, will become more fully apparent from the following detailed description of a preferred embodiment of the invention, with reference being made to the accompanying drawings in which:

FIG. 1 is a view in front elevation, partly in section showing the upper portion of a casing-in machine made according to the invention, FIG. 2 is a view in perspective showing the middle and lower portions of the apparatus of FIG. 1, FIG. 3 is a view in front elevation showing the lower portion of the FIG. 1 apparatus, FIG. 4 is a view in side elevation corresponding to FIG. 3, FIG. 5 is a detailed front elevation, partly in section, showing an adjustable stop device made according to the invention, FIG. 6 is a schematic diagram of the combination pneumatic-hydraulic drive system, FIG. 7 is a circuit diagram for the system.

Figure 8:
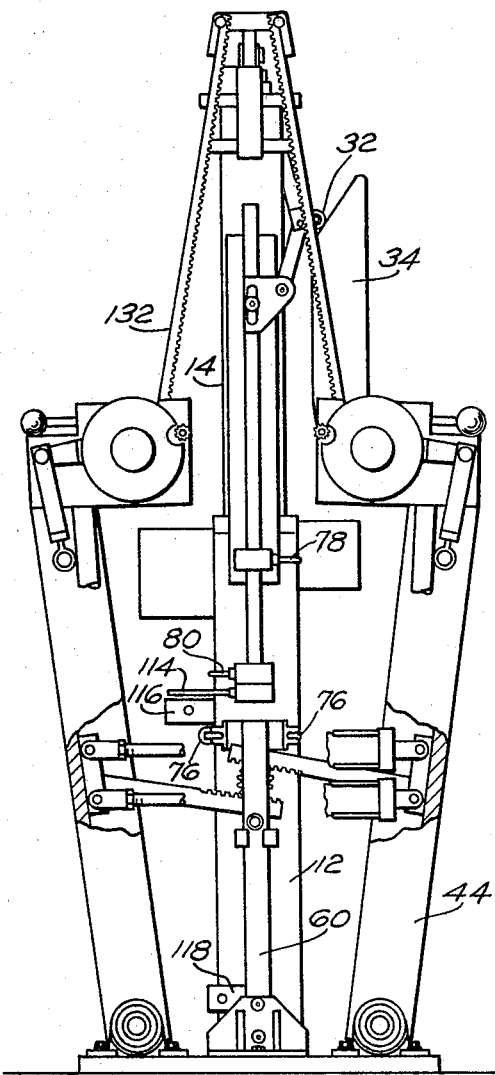
Figure 9:
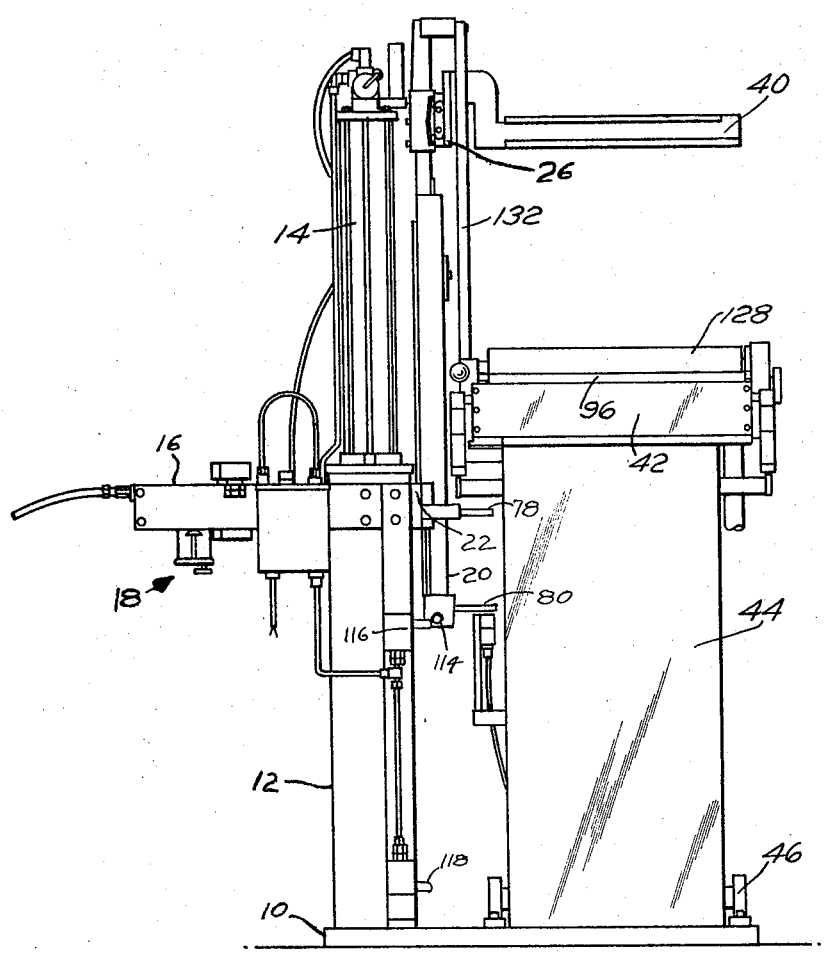

FIG. 8 is a view in front elevation of the apparatus, partly broken away to show details of construction, and FIG. 9 is a view in side elevation thereof.

*Construction*

Referring now to the drawings, the reference character 10 indicates a fixed base for an upright tubular standard 12 having a pneumatically or hydraulically actuated power cylinder 14 mounted co-axially thereof. A transverse bracket 16 is mounted in fixed position on the standard 12 and functions both as a support for control components 18 located on one side of the standard and as a guide for a vertically disposed carriage 20 located on the opposite side of the standard. The carriage 20 slideably engages a grooved track 22 formed in the guide end of the bracket 16 and has its lower portion connected to a piston rod extending downwardly from the cylinder 14 in the tubular standard 12. The forward wall of the standard is formed with a longitudinal opening to accommodate a linkage between the carriage and the piston rod. The carriage is reciprocated by actuation of the cylinder 14.

Mounted near the top of the carriage 20 is a slide 26 arranged for a limited reciprocation relative thereto. It should be understood that the slide reciprocates with the carriage 20 and also is adapted to reciprocate relative to the carriage itself near the bottom of the carriage stroke. Movement of the slide relative to the carriage is controlled by means of a toggle linkage 28 which has an upper link pivotally connected to the slide and a lower link pivotally connected to a plate 30. A cam follower in the form of a roller 32 is mounted on one of the links and bears against the profiled face of a fixed cam plate 34. The function of this mechanism will be set forth in detail along with a general operating description to follow.

Mounted for limited lateral movement on the slide 26 is a block 36 which is slideably mounted on ball bearings disposed between horizontal legs of the block 36 and the upper and lower edges of the slide 26. A vertically disposed centering spring 39 is tensioned between the legs 38 and extends between a pair of pins 41 mounted on the slide 26. It will be understood that the arrangement provides for an automatic self-centering of the slide with respect to the supporting block since the spring will tend to return the slide to a normal center position after any horizontal displacement thereof.

The block 36 carries a horizontally disposed wing 40 in the form of an elongated thin blade over which an unbound book is straddled for pasting. The wing, being laterally displaceable, is thus self-centering so that a book need not be placed on the wing at its precise center.

Reciprocation of the carriage 20 together with the wing 40 carries the unbound book down between a pair of glue pots 42 which are arranged to move to and away from another. Each of the pots 42 is rigidly mounted on the top of a boxed frame 44 which is pivotally mounted at its lower end to the base 10 by means of a shaft 46. The two boxed frames extend upwardly from their supporting shafts 46 and diverge outwardly from one another when in the open position illustrated in FIG. 3. The frames will be moved into general parallelism when the machine is in a closed adhesive applying position.

The two boxed frames 44 are operatively connected by a stabilizing mechanism as shown in FIG. 3 and indicated generally by the reference character 48, by a fluid power system indicated by the reference character 50 in FIG. 2 and by means of an adjustable stop device indicated by the reference character 52 and shown best in FIG. 5. Referring more particularly to FIGS. 3 and 4 the stabilizer 48 comprises a pair of racks 54, one pivotally connected to each of the frame members 44 by means of a pin 56. Each of the pins 56 will be seen to be located in the same horizontal plane. The opposing ends of the racks 54 are in mesh on opposite sides of a pinion 58 rotatably mounted on an upright post 60. Rollers 62 are also rotatably mounted to the post 60 and bear against the smooth sides of the racks to hold the racks in mesh with the pinion 58. It will be noted in FIG. 3 that the pinion 58 is formed with a flange 64 which also assists in holding the racks in mesh with the pinion. It will be appreciated that as the frame members 44 are moved to and away from one another they will move synchronously by reason of the fact that the two racks are in mesh with the same pinion. Any movement of one frame and its rack 54 will be matched by a similar movement of the other frame in its rack, thereby stabilizing the movement of the frame members.

Mounted on the post 60 is a valve 68 which controls the movement of the frame member 44. In practice the system normally functions on compressed air and an inlet conduit 70 connects to the valve 68. The valve is also provided with a pair of outlet conduits 72 and 74 which connect to the fluid power system 50 to be described below. The valves are also provided with a pair of roller type actuators 76 which, upon horizontal tripping, shift the valve from one position to another. As shown in FIG. 1 the carriage 20 is provided with a pair of spaced trips 78 and 80 which are adapted to engage first one actuator and then the other at the start and at the finish of a reciprocation cycle of the carriage. Mounted also on the bracket 66 is a drip pan 82 which extends over the stabilizer and power system.

Referring now more particularly to FIGS. 2 and 6 the fluid power system will be described in detail. The system comprises a pair of parallel pneumatic cylinders 84 and 86 pivotally and drivingly connected at either end to the frame members 44. The upper cylinder 84 functions to move the frame members 44 towards one another while the bottom cylinder 86 functions to spread the frame members apart. The left-hand end of the upper cylinder 84 is connected to the conduit 72 while the right hand thereof is connected to a hydraulic conduit 88 which feeds to an oil reservoir tank 90 through a flow control check valve 92. The conduit 74 connects to the right hand end of the lower cylinder 86. It will be understood that when pressurized air is introduced to the conduit 72, the upper cylinder will be actuated, retracting its piston and rod 94 and thereby forcing together the frame members 44. As the piston is retracted, hydraulic fluid, which is contained in the right hand portion of the cylinder, will be forced from the cylinder 84 through the flow control valve 92 to the tank 90. The hydraulic fluid, in conjunction with the flow control valve which has an adjustable orifice, provides a convenient, adjustable damping control over the action of the pneumatic cylinder. In operation, the frame members are moved quickly but with a damped movement such that there is no jerkiness or sudden stopping or starting of the members. This controlled damped movement is particularly desirable to prevent the glue pots 42 from banging against a book carried therebetween. The flow control valve acts as a cushion on the horizontal air cylinders so as to give a smooth forward and backward movement to the glue pots.

The glue pots are synchronized with the downward movement of the book supporting wing by adjusting the valve 92. Ideally the valve is preset so that small transfer rolls 96, mounted on the glue pots 92, will come in contact with the book approximately one inch below the book joint. The rolls 96 then roll up the book to the joint and then down the entire side. If the transfer rolls strike the book too low or too far away from the joint, there will be a tendency to fold or wrinkle the end leaves. If they strike too high, they will not deposit the adhesive properly in the joints. If the transfer rolls require a slight adjustment, the valve regulator knob may be turned to make the rolls strike the book at the optimum point.

Referring now more particularly to FIG. 5, there is shown the adjustable stop device 52. The device is in the form of a piston 98 and cylinder 100 assembled together with opposing ends pivotally engaging the frame members 44. As viewed in FIG. 5 a threaded link 102 engages the right hand end of the cylinder 100 by means of a drilled and tapped axial recess 104. Locking nuts 106 hold the link and cylinder in an assembled position and it will be understood that the clearance between the transfer rolls 96 may be increased or decreased by the position of the link in relation to the cylinder 100. Mounted within the cylinder 100 is a resilient stop of rubber or the like which is disposed at the right hand end of the cylinder to provide a positive stop for the piston 98. In the left-hand side of the cylinder 100 are a pair of coil springs 110 and 112 compressed between the piston 98 and the left-hand end of the cylinder 100. It will be noted that the spring 112 is of smaller diameter than the spring 110 and extends co-axially within the larger diameter spring. The inner spring 112 is slightly longer than the outer spring to provide a two-stage compression effect. The springs function only when the frame members are being spread apart. In practice, first the inner spring is compressed and then the outer spring starts to compress with both springs being compressed solid at the end of the stroke to provide a fixed stop for the piston. In addition to providing a graduated buffer action and an adjustable stopping mechanism, the device also gives by reason of the compressed spring an initial push to the frame members when the valve 68 is tripped for an opening cycle.

In practice, the stop device 52 is set so that there will be a minimum of 1/8" clearance between the small transfer rolls 96 when in closed position. This is done to prevent damage to the transfer rolls and to the wing. When thin books are not being pasted, it is desirable to have more than 1/8" clearance between the rolls so to prevent an accumulation of adhesive on the wing in the event that it is cycled without a book upon it. To increase the clearance between the transfer rolls when closed, the link 102 is unscrewed to increase the effective length of the device.

Reefrring again to FIG. 1, it will be noted that the carriage 20 also carries a trip 114 which is adapted to actuate microswitches 116 and 118 (see FIG. 7). The micro switches control the main cylinder 14 which reciprocates the book carrying wing and carriage down between the transfer rolls. The main cylinder 14 is pneumatically driven and is controlled by means of a solenoid 120 (see FIG. 6). As the machine cycles the carriage will be reciprocating up and down. As it comes to the top of the cycle the trip 114 will actuate micro switch 116 thereby operating the solenoid 120 so as to reverse the direction of the cylinder. As the carriage moves down to the bottom of the stroke, the trip 114 contacts micro switch 118 to again actuate the solenoid 120 and reverse the direction of the cylinder. As shown in FIG. 7 the operating circuit includes a transformer 122 energized by power leads 124 and under the control of a main switch 126.

Referring again to FIG. 1 it will be seen that each glue pot 42 includes in addition to the transfer roll 96 a master roller 128 rotatably mounted therein and geared to rotate in conjunction with the transfer roller 96. As shown, the glue pot is adapted to contain a quantity of adhesive 130 which is carried to the transfer roller 96 by means of the master roller 128. The rollers are rotated upon reciprocation of the carriage 20 by means of a pair of elongated racks 132 pivoted to the upper end of the carriage and meshing with gears 133 mounted on the end walls of the glue pots 42, all of which is shown in copending application 110,575. In the present case, in addition to a doctor blade 134 for the master roller 128, there is also provided a scraper blade 136 for each transfer roll 96. These blades are mounted on small compression springs 138 contained in slotted brass jibs (not shown). The blade thus exerts a flexible and constant pressure against the transfer roll. The function of the scraper blade is to prevent a build up of excessive adhesive on the underside of the roll. It is important that there be no excessively thick wad of adhesive passed to the book. The result is that the book emerges in a cleaner condition and one which is easier to open. It will be appreciated that an excessive amount of adhesive applied to the book might run over the end sheets causing the pages to stick together.

Operation

The machine is started by closing the switch 126 to energize the solenoid 120 and thus actuate the main cylinder 14. When the piston for the main cylinder reciprocates downwardly, the book carrying wing lowers the book between the transfer rolls. As the carriage moves downwardly, the trip 80 strikes the left-hand actuator 76 for the valve 68 thus actuating the upper cylinder 84. This will cause the frame members and their adhesive applying mechanisms to start moving towards one another. The book will now be lowered between the two transfer rolls as they move towards one another. The transfer rolls make contact first near the back of the book so as to apply a heavy fillet of glue along the hinge lines. The book comes to rest with the book joints supported by the transfer rollers. On the upward stroke the rollers apply an even coating of glue to the remaining portions of the end sheets before separating. The operation is similar to the operation of the apparatus described in U.S. Patent No. 3,117,890 referred to above. As the carriage approaches the bottom of its stroke, the trip 78 will strike the right hand actuator of the valve 68 thereby shifting compressed air to the lower cylinder 86 and relieving the upper cylinder 84. This will cause the frame members to spread apart. At the bottom of the stroke the trip 114 will actuate the switch 118 thereby reversing the position of the solenoid 120 causing the piston of the main cylinder 14 to reciprocate upwardly to carry the wing and book between a transfer roller while receiving a coat of adhesive.

During the downward stroke of the carriage, the main rollers 128 will be rotated through the operation of the racks 132 and will pick up a film of adhesive which the transfer rolls will apply to the end sheets. The machine is so timed that the small transfer rolls will come in contact with the book approximately 1″ below the joint. They then roll up the book to the joint and then down the entire side. It will be understood that the downward movement of the book will stop when the joints of the book come down against the transfer rolls 96, whereas the wing and carriage will descend perhaps another inch or more depending upon the thickness of the book.

On the upward stroke of the carriage 20, the toggle 28 and cam 34 are put to use. Assuming the carriage is at the bottom of a stroke and starting to move upwardly, the follower 32 will move up inclined lower face of the cam 34 and bias the toggle so that the wing is given a short upward movement. This movement will be sufficient to move the wing all the way up into the back of the book, thus transferring the support of the book from the transfer rolls 96 back to the wing. Unless this were done, the book would be carried up between the rollers with the wing perhaps an inch or more below the back. As soon as the book is moved up out of the bite of the rollers, the compressive pressure on the book would be relieved and it would drop back down under its own weight until stopped by either the wing or the lower edges of the book striking the rollers. Since the edges of the inner pages would become smeared with adhesive if this were allowed to happen, it is necessary to move the wing all of the way up to the back of the book before the book clears the rollers. At the end of the cycle a cover is placed on the back of the book by the operator while it is still on the wing and the assembled book transferred to a press.

As the carriage reaches the top of its stroke the trip 114 will actuate the switch 116 to recycle the machine.

While the invention has been described with particular reference to the illustrated embodiment, it will be understood that numerous modifications thereto will appear to those skilled in the art. Accordingly, the above invention and accompanying drawings should be taken as illustrative of the invention and not in a limiting sense.

Having thus described our invention, what we claim and desired to obtain by Letters Patent of the United States is:

1. In a casing-in machine, having a fixed base, a pair of frame members pivotally mounted to said base, and an adhesive applicator mounted on each of said frame members, a control system, including a pair of pneumatic piston and cylinder units drivingly connecting said frame members for moving said frame members to and away from one another, one of said units being adapted to move said members towards one another and the other of said units being adapted to move said members part, liquid storage means associated with said one unit, a conduit connecting said one cylinder to said storage means and a flow control valve disposed in said conduit for restricting the flow of a charge of liquid from said one cylinder to said storage means when said one piston is reciprocated in moving said members towards one another.

2. In a casing-in machine according to claim 1 including an elongated rack connected to each of said frame members and a gear rotatably mounted between said members, both of said racks being in mesh with said pinion to provide a synchronous connection to said members.

3. In a casing-in machine according to claim 1 wherein said valve provides a flow restriction in one direction and free flow in the opposite direction.

4. In a casing-in machine, having a fixed base, a pair of frame members pivotally mounted to said base, and an adhesive applicator mounted on each of said frame members, a control system, including power means drivingly connecting said frame members for moving said frame members to and away from one another, an adjustable stop device for limiting the movement of said frame members, said device including a cylinder and a piston mounted for reciprocation therein, said cylinder having one end connecting one of said frame members, said piston connecting the other of said frame members, a resilient cushion mounted within one end of said cylinder to limit the movement of said piston in one direction and a pair of telescopic coaxial coil springs mounted within the opposite end of said cylinder to limit the movement of said piston in the opposite direction, one of said springs being longer than the other to provide a two-stage resilient stop for said piston.

5. In a casing-in machine according to claim 4 including a link threaded to said stop device and connected to one of said frame members whereby the effective length of said device may be increased or decreased by rotation of said link.

6. In a casing-in machine, having a fixed base, a pair of frame members pivotally mounted to said base, an adhesive applicator mounted on each of said frame members, a control system, including a pair of pneumatic piston and cylinder units drivingly connecting said frame members, one of said units being adapted to move said members towards one another and the other of said units being adapted to move said members part, liquid storage means associated with said one unit, a conduit connecting said one cylinder to said storage means, a flow control valve disposed in said conduit for restricting the flow of a charge of liquid from said one cylinder to said storage means when said one piston is reciprocated in moving said members towards one another, a book-carrying member adapted to reciprocate between said applicator and a two way valve responsive to the position of said book-carrying member for sequentially actuating said units.

7. In a casing-in machine according to claim 6 including a pair of racks each connected to a frame member and a pinion in mesh with both of said racks and rotatably mounted between said members for synchronizing the movements of said members.

References Cited by the Examiner
UNITED STATES PATENTS

| | | | |
|---|---|---|---|
| Re. 13,412 | 4/1912 | Norton | 118—227 X |
| 3,066,046 | 11/1962 | Walton | 118—227 X |

CHARLES A. WILLMUTH, *Primary Examiner.*

L. G. MACHLIN, *Assistant Examiner.*